US011818682B2

(12) United States Patent
Yu et al.

(10) Patent No.: US 11,818,682 B2
(45) Date of Patent: Nov. 14, 2023

(54) COMMUNICATION METHOD AND APPARATUS

(71) Applicant: ALIBABA GROUP HOLDING LIMITED, Grand Cayman (KY)

(72) Inventors: Xiaobo Yu, Hangzhou (CN); Wenbing Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 272 days.

(21) Appl. No.: 17/186,510

(22) Filed: Feb. 26, 2021

(65) Prior Publication Data

US 2021/0185634 A1     Jun. 17, 2021

Related U.S. Application Data

(63) Continuation of application No. PCT/CN2019/101915, filed on Aug. 22, 2019.

(30) Foreign Application Priority Data

Aug. 31, 2018   (CN) .......................... 201811008890.5

(51) Int. Cl.
| | |
|---|---|
| *H04W 4/00* | (2018.01) |
| *H04W 64/00* | (2009.01) |
| *H04W 76/11* | (2018.01) |
| *H04W 52/02* | (2009.01) |
| *H04W 52/28* | (2009.01) |

(52) U.S. Cl.
CPC ..... *H04W 64/003* (2013.01); *H04W 52/0261* (2013.01); *H04W 52/285* (2013.01); *H04W 76/11* (2018.02)

(58) Field of Classification Search
CPC ............... H04W 64/003; H04W 76/11; H04W 52/0261; H04W 52/285
See application file for complete search history.

(56) References Cited

U.S. PATENT DOCUMENTS

| | | | |
|---|---|---|---|
| 5,946,612 A * | 8/1999 | Johansson ............. | H04W 16/18 455/449 |
| 8,954,083 B1 * | 2/2015 | Yenney ................. | H04W 16/18 455/421 |

(Continued)

FOREIGN PATENT DOCUMENTS

| | | |
|---|---|---|
| CN | 101014194 A | 8/2007 |
| CN | 105527643 A | 4/2016 |

(Continued)

OTHER PUBLICATIONS

PCT International Search Report and Written Opinion dated Nov. 21, 2019 issued in corresponding International Application No. PCT/CN2019/101915 (8 pgs.).

(Continued)

*Primary Examiner* — Justin Y Lee
(74) *Attorney, Agent, or Firm* — Finnegan, Henderson, Farabow, Garrett & Dunner, LLP

(57) ABSTRACT

A terminal communicates with base stations by receiving a first beacon frame sent by a first base station, the first beacon frame including first location information representing a location of the first base station. In response to one of a determination that a distance between the first location information and second location information is greater than a first predetermined threshold or a determination that a difference between first received signal strength information and second received signal strength information is greater than a second predetermined threshold, the terminal sends first information to a network server, the first information causing the network server to select a base station that transmits downlink data to the terminal. The second location information represents a location of a second base station corresponding to a second beacon frame received before the first beacon frame is received.

15 Claims, 9 Drawing Sheets

(56) References Cited

U.S. PATENT DOCUMENTS

| | | | | |
|---|---|---|---|---|
| 9,992,775 | B2* | 6/2018 | Katar | H04W 8/02 |
| 2004/0058678 | A1* | 3/2004 | deTorbal | H04W 36/32 |
| | | | | 455/99 |
| 2010/0110887 | A1 | 5/2010 | Beaujean et al. | |
| 2013/0176869 | A1* | 7/2013 | Finlow-Bates | H04W 52/0254 |
| | | | | 370/252 |
| 2015/0219742 | A1 | 8/2015 | Castagnoli et al. | |
| 2018/0167982 | A1 | 6/2018 | Lee et al. | |

FOREIGN PATENT DOCUMENTS

| | | |
|---|---|---|
| CN | 106341852 A | 1/2017 |
| CN | 106413082 A | 2/2017 |
| CN | 108235386 A | 6/2018 |
| EP | 3232696 A1 | 10/2017 |
| WO | WO 2020/042994 A1 | 3/2020 |

OTHER PUBLICATIONS

European Patent Office Communication issued for Application No. 19855247.3 which encloses the extended European Search Report which includes pursuant to Rule 62 EPC, the Supplementary European Search Report (Art. 153(7) EPC) and the European search opinion, dated Dec. 8, 2021, 11 pages.

First Search Report issued in corresponding Chinese Application No. 201811008890.5 dated Sep. 28, 2022 (2 pages).

First Office Action issued in corresponding Chinese Application No. 201811008890.5 dated Oct. 11, 2022 (9 pages).

* cited by examiner

Receiving a first beacon frame sent by a first base station, wherein the first beacon frame includes first location information, and the first location information is used to characterize a location of the first station ⎯ S110

In the case where a distance between the first location information and second location information is greater than a first predetermined threshold or where a difference between first received signal strength information and second received signal strength information is greater than a second predetermined threshold, sending first information to a network server, the first information being used to cause the network server to update a base station corresponding to downlink data of the terminal based on the first information, wherein the second location information is used to characterize a location of a second base station corresponding to a second beacon frame received before the first beacon frame is received, and the second received signal strength information is used to characterize a received signal strength of the second beacon frame ⎯ S120

*FIG. 1*

COMMUNICATION METHOD AND APPARATUS

CROSS-REFERENCE TO RELATED APPLICATION

The present disclosure claims the benefits of priority to International Application No. PCT/CN2019/101915, filed on Aug. 22, 2019, which claims priority to Chinese Patent Application No. 201811008890.5 filed on Aug. 31, 2018, both of which are incorporated herein by reference in their entireties.

BACKGROUND

Long Range (LoRa) is a low-power long-distance wireless transmission scheme based on a spread spectrum technology. Long Range Wide Area Network (LoRaWAN) specification is a low-power wide-area Internet of Things solution.

In class B of the LoRaWAN specification, a Beacon includes GPS latitude and longitude information. After receiving the Beacon, a terminal can acquire GPS latitude and longitude information of a base station that sends to the Beacon. If the terminal detects that the GPS latitude and longitude information has changed, the terminal can actively report a data packet so that a network server can change a router according to the acquired data packet, e.g., change a base station through which the network server sends downlink data to the terminal. The router is a base station selected by the network server to transmit downlink data to the terminal. The server transmits downlink data to the terminal, and the terminal transmits uplink data to the server.

However, even GPS latitude and longitude information in Beacons issued by the same base station can be slightly different. Each time the terminal receives a Beacon among the slightly different Beacons from the same base station, the terminal uploads an uplink data packet to update the router, which can cause unnecessary power consumption of the terminal and greatly reduce the battery life of the terminal.

SUMMARY

Embodiments of the present disclosure provide communication methods and devices. The method can include receiving a first beacon frame sent by a first base station, wherein the first beacon frame comprises first location information, and the first location information comprises a location of the first base station; and in response to one of a determination that a distance between the first location information and second location information is greater than a first predetermined threshold or a determination that a difference between first received signal strength information and second received signal strength information is greater than a second predetermined threshold, sending first information to a network server that is enabled to update a base station through which the network server transmits downlink data to the terminal, wherein the second location information comprises a location of a second base station corresponding to a second beacon frame received before the first beacon frame is received, and the second received signal strength information comprises a received signal strength of the second beacon frame.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 1 is a schematic flowchart illustrating an exemplary communication method between a terminal and a base station, consistent with some embodiments of the present disclosure.

DETAILED DESCRIPTION

Figure 2:
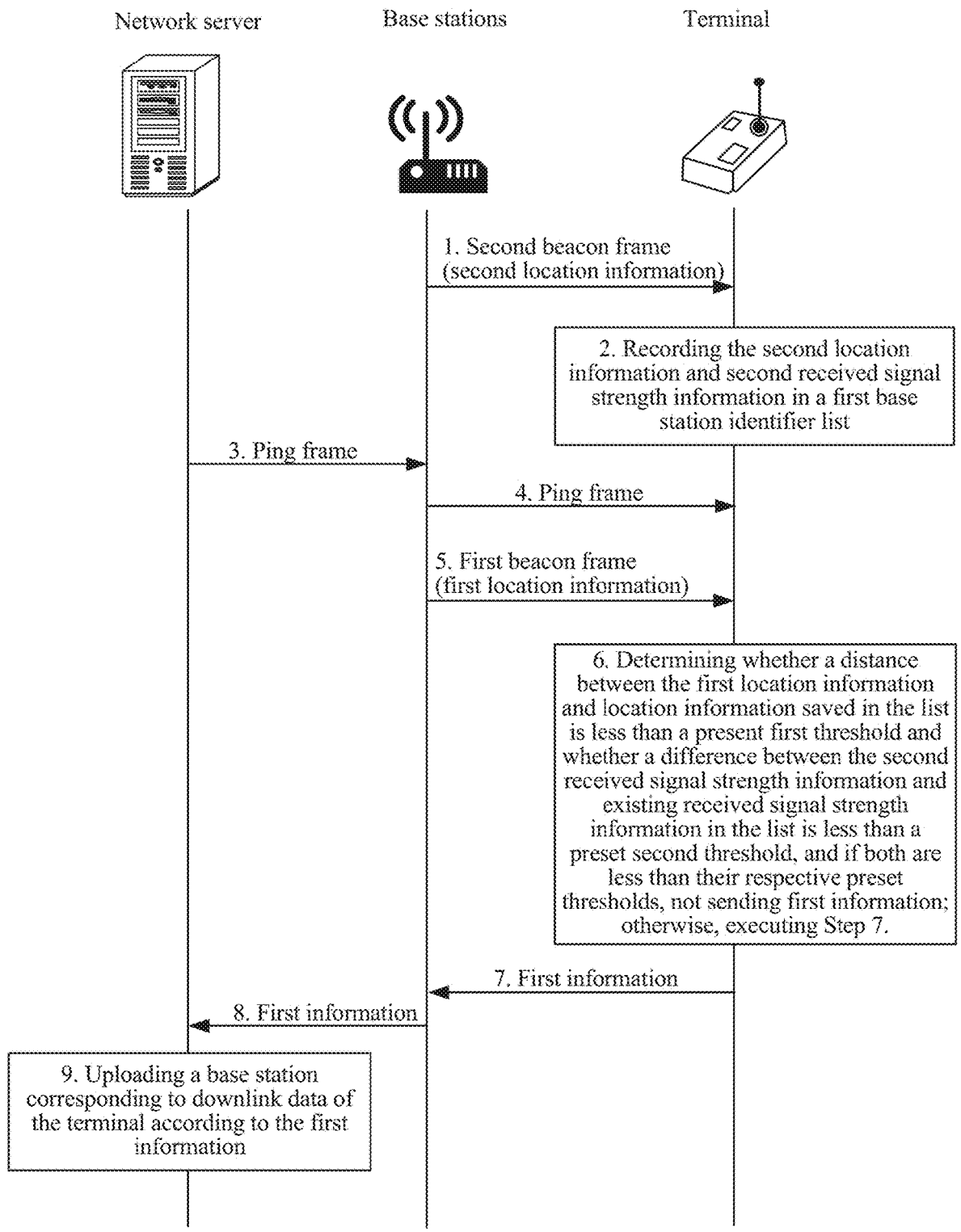
FIG. 2 is a schematic diagram illustrating an exemplary process in a LoRaWAN scenario, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

As described above, determining whether a beacon is from a same base station based only on GPS latitude and longitude information can cause a terminal to send an unnecessary request to update a current base station, because slightly different GPS information can belong to the same base station. The embodiments of the present disclosure provide solutions to address the above-mentioned problems, an exemplary system uses geographic location information or a combination of geographic location information and received signal strength information as parameter information for identifying a base station, and determines, by comparing the magnitude of a change between parameter information of a currently received beacon frame and parameter information of a previously received beacon frame, whether the beacon frame received this time and the previously received beacon frame are issued by the same base station, or determines, by comparing whether a base station identifier in the currently received beacon frame is same with a base station identifier in the previously received beacon frame, whether the beacon frame received this time and the previously received beacon frame are issued by the same base station. In this way, the accuracy of determination can be improved, and the power consumption of the terminal can be saved. For example, power consumption of the terminal can be greatly reduced, and a battery life of the terminal can be improved.

In order to improve the accuracy of determination and save the power consumption of the terminal, the present disclosure proposes that it is possible to use a combination of geographic location information and received signal strength information, or geographic location information, as parameter information for identifying a base station, and determine, by comparing the magnitude of a change between parameter information of a currently received beacon frame and parameter information of a previously received beacon frame, whether the beacon frame received this time and the previously received beacon frame are issued by the same base station. For example, it is possible to determine, by comparing whether a distance between geographic location information of a base station in the currently received beacon frame and geographic location information of a base station in the previously received beacon frame exceeds a first predetermined threshold, whether the beacon frame received this time and the previously received beacon frame are issued by the same base station. For another example, it is also possible to determine, by comparing at the same time whether a distance between the currently received geographic location information and the previously received geographic location information exceeds a first predetermined threshold and whether a difference between received signal strengths of the beacon frames exceeds a second predetermined threshold, whether the currently received beacon frame and the previously received beacon frame are issued by the same base station.

In addition, the present disclosure proposes that it is also possible to determine, by comparing whether a Gateway Extended Unique Identifier (GWEUI) in the currently received beacon frame is consistent with a GWEUI in the previously received beacon frame, whether the beacon frame received this time and the previously received beacon frame are issued by the same base station.

Some conventional systems can include simply comparing whether GPS information in the beacon frame has changed. In comparison, the determination methods of the present disclosure are more accurate, which can reduce the number of times the terminal sends unnecessary base station update frames, reduce power consumption of the terminal, and extend the service life of the terminal battery.

FIG. 1 is a schematic flowchart illustrating an exemplary communication method between a terminal and a base station, consistent with some embodiments of the present disclosure. The method shown can be performed by a terminal. The method can include the following steps.

In step S110, a first beacon frame sent by a first base station is received.

In step S120, in the case where a distance between first location information and second location information is greater than a first predetermined threshold or where a difference between first received signal strength information and second received signal strength information is greater than a second predetermined threshold, first information is sent to a network server.

The first beacon frame includes the first location information, and the first location information is used to characterize the location of the first base station. The second location information is used to characterize the location of a second base station corresponding to a second beacon frame received before the first beacon frame is received. The first base station and the second base station can be the same base station or can be different base stations. As an example, the first location information and the second location information can be GPS information of a corresponding base station, such as GPS latitude and longitude information.

The first received signal strength information is used to characterize the received signal strength of the first beacon frame received. The second received signal strength information is used to characterize the received signal strength of the second beacon frame received before the first beacon frame is received. In the present disclosure, both the second received strength information and the second location information can be regarded as parameter information used to identify the second base station corresponding to the second beacon frame received before the first beacon frame is received.

As an example of the present disclosure, before step S110 is performed, a second beacon frame sent by the second base station can also be received, and the second beacon frame includes the second location information. In addition, the second received signal strength information of the second beacon frame can also be recorded.

After the first beacon frame is received, it is possible to determine whether the distance between the first location information and the second location information is greater than a first predetermined threshold, and determine whether the difference between the first received signal strength information and the second received signal strength information is greater than a second predetermined threshold.

In the case where the distance between the first location information and the second location information is greater than the first predetermined threshold or where the difference between the first received signal strength information and the second received signal strength information is greater than the second predetermined threshold, it can be considered that the first beacon frame and the second beacon frame are issued by different base stations (that is, the first base station is different from the second base station), and the first information can be sent to the network server at this time.

In other words, in the case where the distance between the first location information and the second location information is not greater than the first predetermined threshold, and the difference between the first received signal strength information and the second received signal strength information is not greater than the second predetermined threshold, it can be considered that the first beacon frame and the second beacon frame are issued by the same base station, that is, the first base station and the second base station are the same base station. Therefore, if the distance between the first location information and the second location information is not greater than the first predetermined threshold, and the difference between the first received signal strength information and the second received signal strength information is not greater than the second predetermined threshold, then the first information is not sent to the network server.

The first information is used to cause the network server to update a base station corresponding to downlink data of the terminal based on the first information. The first information can be an information frame that carries certain data information, such as a base station update request (that is, an uplink route update frame). In addition, the first information can also be an empty packet, and the data content contained in the first information is not limited in the present disclosure. The first information sent can be received by one or more base stations, and forwarded by the one or more base stations to the network server. The network server can update a base station corresponding to downlink data of the terminal according to quality data of the first information received, such as received signal strength indicator (RSSI) or signal-to-noise ratio (SNR). For example, the base station with the largest received signal strength indicator (RSSI) or signal-to-noise ratio (SNR) can be selected as the base station corresponding to the downlink data of the terminal.

The terminal can maintain a base station identifier list (e.g., first base station identifier list). The base station identifier list can contain parameter information that can distinguish different base stations. The parameter information can be a base station identifier, that is, base station extended unique identifier e.g., Gateway Extended Unique Identifier (GWEUI). The GWEUI can be a 64-bit EUI. In addition, the parameter information can also be at least one of base station location information (e.g., latitude and longitude information) or received signal strength information. The second location information and the second received signal strength information are recorded in the first base station identifier list, for example, the second location information and the second received signal strength information can be recorded, in association, in the first base station identifier list. In the case where the distance between the first location information and the second location information is greater than the first predetermined threshold or where the difference between the first received signal strength information and the second received signal strength information is greater than the second predetermined threshold, it can be considered that the first base station is different from the second base station corresponding to the previously received second beacon frame. At this time, the first location information and the first received signal strength information can be written (which can be written in association) into the first base station identifier list as a base station identifier parameter for identifying the first base station. Therefore, multiple sets of base station identifier parameters respectively used to identify different base stations can be recorded in the first base station identifier list. When a new beacon frame is subsequently received, location information and received signal strength information in the new beacon frame can be respectively compared with each set of base station identifier parameters (i.e., location information and received signal strength information) recorded in the first base station identifier list. If there is no base station identifier parameter for which the difference in location information is less than the first predetermined threshold and the difference in received signal strength is less than the second predetermined threshold in the first base station identifier list, it can be considered that the base station corresponding to the currently received beacon frame is a new base station, and first information can be sent to a network server.

FIG. 2 is a schematic diagram illustrating an exemplary process in a LoRaWAN scenario, consistent with some embodiments of the present disclosure.

The network server shown in FIG. 2 can be a LoRaWAN server, and the base station (referred as Gateway) can be a LoRa base station. The terminal (End-device) and the network server can communicate based on the LoRaWAN protocol, that is, the terminal can send uplink data to the server through one or more base stations, and the server can also send downlink data to the terminal through one or more base stations. In addition, the distribution of the base stations through which the uplink data passes and the base stations through which the downlink data passes can be consistent or inconsistent.

The terminal (End-device) may be a terminal working in the class B mode of the LoRaWAN protocol. In class B, the base station sends a Beacon every 128 seconds, and the End-device opens a receiving window periodically, which is referred to as a "ping slot," and the downlink communication sent by the network server in the receiving window is referred to as a "ping frame." The process can include the following steps. The base stations as shown in FIG. 2 can be gateways. The term "base station" and the term "gateway" are used interchangeably hereafter. The base stations can be referred to as gateways.

In step 1, a second base station (referred as Gateway 2) sends a second beacon frame to the terminal working in the class B mode, and the second beacon frame includes second location information used to characterize a location of Gateway 2.

In step 2, the second location information and the second received signal strength information of the second beacon frame received by the terminal are recorded in the first base station identifier list as parameter information for distinguishing the second base station.

In step 3, the network server sends a ping frame to the base stations (e.g., Gateways).

In step 4, the Gateways send a ping frame to the End-device.

In step 5, the first base station (Gateway 1) sends a first beacon frame to the terminal, and the first beacon frame includes first location information used to characterize a location of Gateway 1.

In step 6, the terminal compares two parameters of the received first beacon frame (the first location information and the first received signal strength information of the first beacon frame) with two parameters in the first base station identifier list. It is determined whether a distance between the first location information and the location information saved in the list (i.e., the second location information) is less than a preset first threshold and whether a difference between the first received signal strength information and the received signal strength information saved in the list (i.e., the second received signal strength information) is less than a preset second threshold. If both are less than their respective preset thresholds, it is considered that the first beacon frame and the second beacon frame are issued by the same base station, and first information is not sent; and if the above-mentioned conditions are not met, step 7 is performed.

In step 7, the terminal sends the first information to the base stations (e.g., Gateways).

In step 8, the Gateways send the first information to the network server.

In step 9, the network server updates a base station corresponding to downlink data of the terminal according to the first information. For example, the network server can select the Gateway with the strongest received signal as the base station corresponding to the downlink data of the terminal.

Some conventional systems can include simply comparing whether GPS information in the beacon frame has changed. In comparison, the determination method based on the magnitude of a change in GPS information proposed in the present disclosure is more accurate, which can reduce the number of times the terminal sends unnecessary base station update frames, reduce power consumption of the terminal, and extend the service life of the terminal battery.

Figure 3:
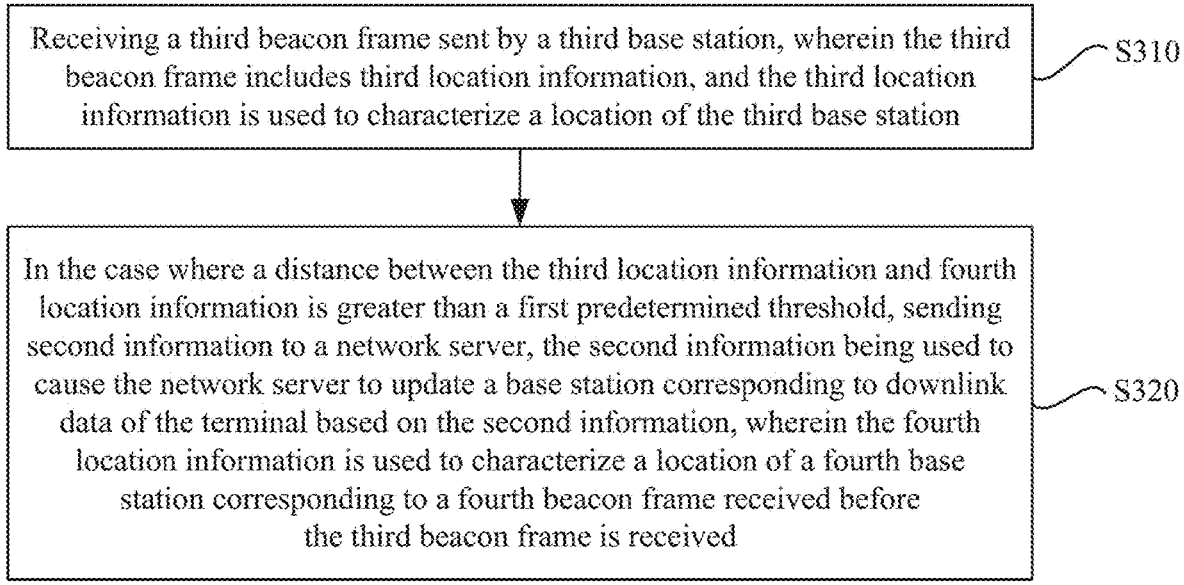
FIG. 3 is a schematic flowchart illustrating an exemplary communication method between a terminal and a base station, consistent with some embodiments of the present disclosure.

FIG. 3 is a schematic flowchart illustrating an exemplary communication method between a terminal and a base station, consistent with some embodiments of the present disclosure. The method can be performed by a terminal. The method can include the following steps.

In step S310, a third beacon frame sent by a third base station is received.

In step S320, in the case where a distance between third location information and fourth location information is greater than a first predetermined threshold, second information is sent to a network server.

The third beacon frame includes third location information, and the third location information is used to characterize a location of the third base station. The fourth location information is used to characterize a location of a fourth base station corresponding to a fourth beacon frame received before the third beacon frame is received. The third base station and the fourth base station can be the same base station or can be different base stations. As an example, the third location information and the fourth location information can be GPS information of a corresponding base station, such as GPS latitude and longitude information.

As an example of the present disclosure, before step S310 is performed, the fourth beacon frame sent by the fourth base station can also be received, and the fourth beacon frame includes fourth location information.

After the third beacon frame is received, it is possible to determine whether the distance between the third location information and the fourth location information is greater than the first predetermined threshold.

In the case where the distance between the third location information and the fourth location information is greater than the first predetermined threshold, it can be considered that the third base station is different from the fourth base station, and the second information can be sent to the network server. In other words, in the case where the distance between the third location information and the fourth location information is not greater than the first predetermined threshold, it can be considered that the third beacon frame and the fourth beacon frame are issued by the same base station, that is, the third base station and the fourth base station are the same base station. Therefore, if the distance between the third location information and the fourth location information is not greater than the first predetermined threshold, the second information is not sent to the network server.

The same as the role of the first information described above, the second information is used to cause the network server to update the base station corresponding to the downlink data of the terminal based on the first information. The second information can be an information frame that carries certain data information, such as a base station update request (that is, an uplink route update frame). In addition, the second information can also be an empty packet, and the data content contained in the first information is not limited in the present disclosure. The second information sent can be received by one or more base stations, and forwarded by the one or more base stations to the network server. The network server can update a base station corresponding to downlink data of the terminal according to quality data of the second information received (such as received signal strength indicator (RSSI) or signal-to-noise ratio (SNR)). For example, the base station with the largest received signal strength indicator (RSSI) or signal-to-noise ratio (SNR) can be selected as the base station corresponding to the downlink data of the terminal.

The terminal can maintain a base station identifier list (referred to as a "second base station identifier list"), and the third location information is recorded in the second base station identifier list. In the case where the distance between the third location information and the fourth location information is greater than the first predetermined threshold, it can be considered that the third base station is different from the fourth base station corresponding to the previously received fourth beacon frame. At this time, the third location information can be written into the second base station identifier list as a base station identifier parameter for identifying the third base station. Therefore, a plurality of base station identifier parameters respectively used to identify different base stations can be recorded in the second base station identifier list. In the case where a new beacon frame is subsequently received, the location information in the new beacon frame can be respectively compared with each base station identifier parameter (i.e., location information) recorded in the second base station identifier list. If there is no base station identifier parameter for which the difference in location information is less than a first predetermined threshold in the second base station identifier list, it can be considered that the base station corresponding to the currently received beacon frame is a new base station, and the second information can be sent to the network server, and the location information in the new beacon frame can be written into the second base station identifier list.

Figure 4:
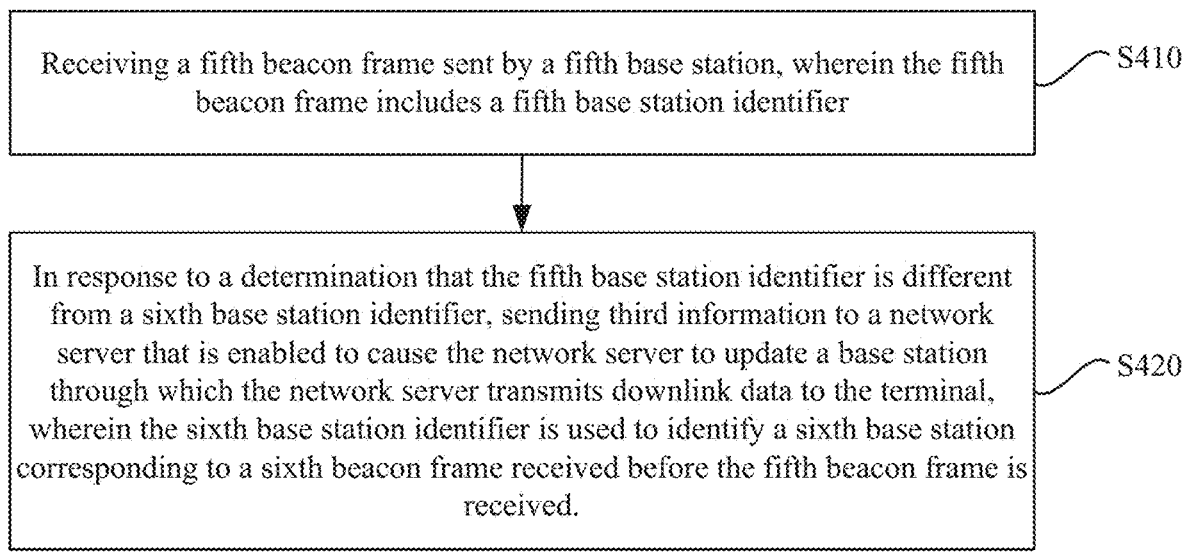
FIG. 4 is a schematic flowchart illustrating an exemplary communication method between a terminal and a base station, consistent with some embodiments of the present disclosure.

FIG. 4 is a schematic flowchart illustrating an exemplary communication method between a terminal and a base station, consistent with some embodiments of the present disclosure. The method can be performed by a terminal. The method can include the following steps.

In step S410, a fifth beacon frame sent by a fifth base station is received.

In step S420, in the case where a fifth base station identifier is inconsistent with a sixth base station identifier, third information is sent to a network server.

The fifth beacon frame includes the fifth base station identifier, and the fifth base station identifier is used to identify the fifth base station that sends the fifth beacon frame. The sixth base station identifier is used to identify a sixth base station corresponding to a sixth beacon frame received before the fifth beacon frame is received. The fifth base station and the sixth base station can be the same base station or can be different base stations. The fifth base station identifier and the sixth base station identifier can be base station extended unique identifiers (Gateway Extended Unique Identifiers, GWEUIs), such as 64-bit EUIs.

As an example of the present disclosure, before step S410 is performed, the sixth beacon frame sent by the sixth base station can also be received, and the sixth beacon frame includes the sixth base station identifier.

After receiving the fifth beacon frame, it is possible to determine whether the fifth base station identifier is consistent with the sixth base station identifier. If the fifth base station identifier is consistent with the sixth base station identifier, it can be considered that the fifth beacon frame and the sixth beacon frame are issued by the same base station, that is, the fifth base station and the sixth base station are the same base station. Therefore, in the case where the fifth base station identifier is consistent with the sixth base station identifier, the third information is not sent to the network server. If the fifth base station identifier is inconsistent with the sixth base station identifier, it can be considered that the fifth beacon frame and the sixth beacon frame are not issued by the same base station, that is, the fifth base station and the sixth base station are not the same base station. Therefore, in the case where the fifth base station identifier is inconsistent with the sixth base station identifier, the third information is sent to the network server.

The same as the role of the first information and the second information described above, the third information is used to cause the network server to update the base station corresponding to the downlink data of the terminal based on the third information. The third information can be an information frame that carries certain data information, such as a base station update request (that is, an uplink route update frame). In addition, the third information can also be an empty packet, and the data content contained in the first information is not limited in the present disclosure. The third information sent can be received by one or more base stations and forwarded by the one or more base stations to the network server. The network server can update a base station corresponding to downlink data of the terminal according to quality data of the third information received (such as received signal strength indicator (RSSI) or signal-to-noise ratio (SNR)). For example, the base station with the largest received signal strength indicator (RSSI) or signal-to-noise ratio (SNR) can be selected as the base station corresponding to the downlink data of the terminal.

The terminal can maintain a base station identifier list (referred to as a "third base station identifier list"), and the sixth base station identifier can be recorded in the third base station identifier list. In the case where the fifth base station identifier is inconsistent with the sixth base station identifier, it can be considered that the fifth base station is different from the sixth base station. At this moment, the fifth base station identifier can be written into the third base station identifier list as a base station identifier parameter for identifying the fifth base station. Therefore, a plurality of base station identifier parameters respectively used to identify different base stations can be recorded in the third base station identifier list. In the case where a new beacon frame is subsequently received, a base station identifier in the new beacon frame can be respectively compared with each base station identifier parameter (i.e., base station identifier) recorded in the third base station identifier list. If the base station identifier in the new beacon frame does not appear in the third base station identifier list, it can be considered that the base station corresponding to the currently received beacon frame is a new base station, the third information can be sent to the network server, and the base station identifier in the new beacon frame can be written into the third base station identifier list.

Figure 5:
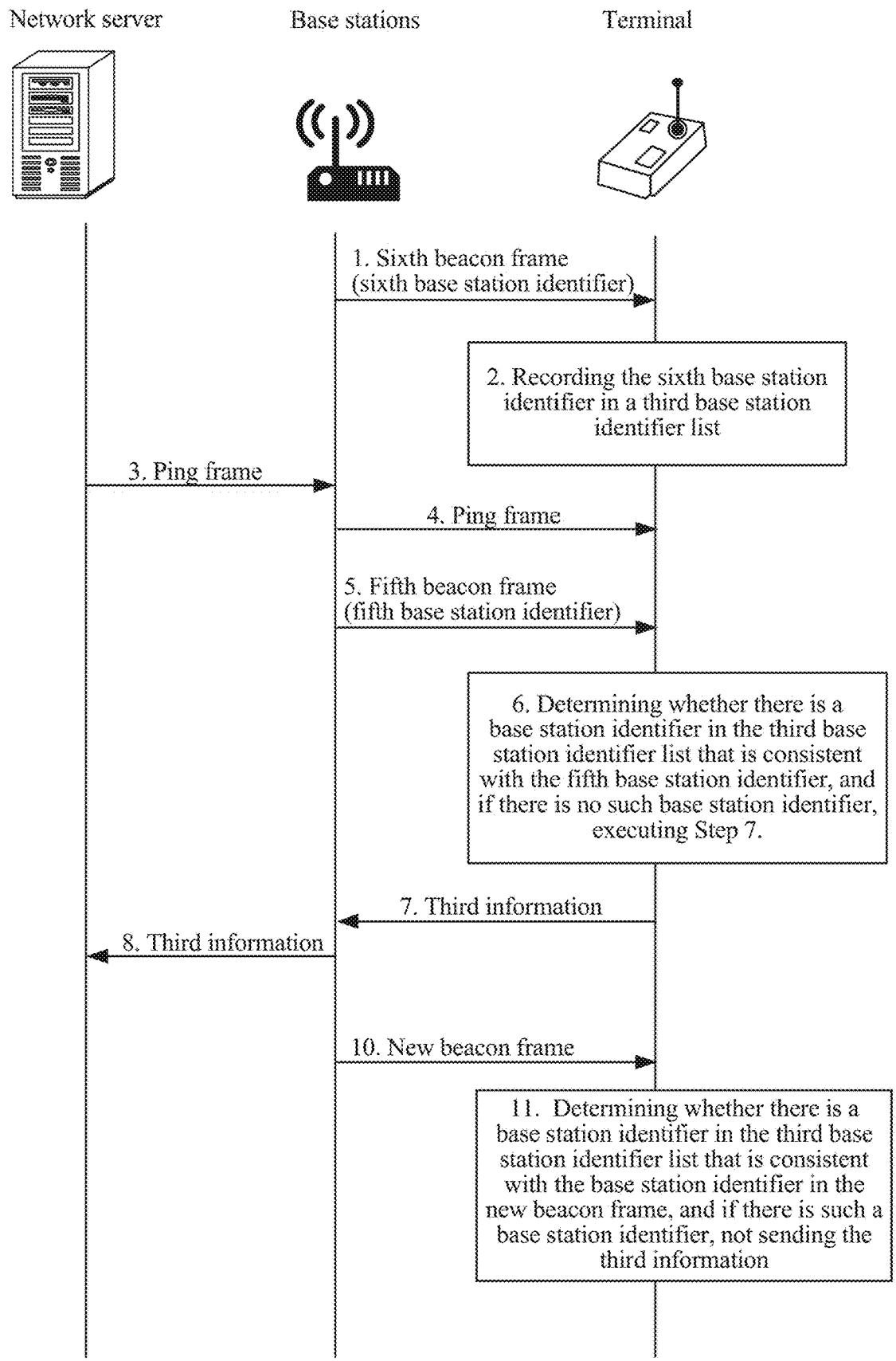
FIG. 5 is a schematic flow illustrating an exemplary process in a LoRaWAN scenario, consistent with some embodiments of the present disclosure.

FIG. 5 is a schematic flow illustrating an exemplary process in a LoRaWAN scenario, consistent with some embodiments of the present disclosure.

The network server can be a LoRaWAN server, and the base station (referred as Gateway) can be a LoRa base station. The terminal (referred as End-device) and the network server can communicate based on the LoRaWAN protocol, that is, the terminal can send uplink data to the server through one or more base stations, and the server can also send downlink data to the terminal through one or more base stations. In addition, the distribution of the base stations through which the uplink data passes and the base stations through which the downlink data passes can be consistent or inconsistent.

In the present disclosure, the End-device can be a terminal working in the class B mode of the LoRaWAN protocol. In class B, the base station sends a Beacon every 128 seconds, and the End-device opens a receiving window periodically, which is referred to as a "ping slot," and the downlink communication sent by the network server in the receiving window is referred to as a "ping frame." The process can include the following steps. The base stations as shown in FIG. 5 can be gateways. The term "base station" and the term "gateway" are used interchangeably hereafter. The base stations can be referred to as gateways.

In step 1, A sixth base station (referred to as Gateway 6) sends a sixth beacon frame to the terminal working in the class B mode, and the sixth beacon frame includes a sixth base station identifier for identifying the sixth base station.

In step 2, after receiving the sixth beacon frame carrying the sixth base station identifier, the terminal can record the sixth base station identifier in the third base station identifier list.

In step 3, the network server sends a ping frame to the Gateways.

In step 4, the base stations (such as Gateway 6) forward to the End-device a ping frame sent by the network server.

As shown in steps 5 to 9 in FIG. 5, if the fifth base station (referred as Gateway 5) subsequently sends a fifth beacon frame to the terminal working in the class B mode, the fifth beacon frame includes a fifth base station identifier for identifying the fifth base station. The terminal can determine the fifth base station identifier carried in the received fifth beacon frame and the sixth base station identifier in the sixth beacon frame received last time. For example, it is possible to determine whether there is a base station identifier in the third base station identifier list that is consistent with the fifth base station identifier. If there is such a base station identifier, it indicates that the third information does not need to be sent; and if there is no such base station identifier, the third information needs to be sent, and the fifth base station identifier can also be written into the third base station identifier list. As an example, the third information sent by the terminal can be sent to the network server through at least one of Gateway 1 or Gateway 2. The network server can update a base station corresponding to downlink data of the terminal according to the third information. For example, the Gateway with the strongest received signal can be selected as the base station corresponding to the downlink data of the terminal.

As shown in steps 10 to 11 in FIG. 5, if the terminal subsequently receives a new beacon frame, it is possible to determine whether there is a base station identifier in the third base station identifier list that is consistent with the base station identifier in the new beacon frame. If there is such a base station identifier, the third information is not sent; otherwise, the third information is sent. For example, assume that Gateway 6 sends a Beacon frame again to the terminal working in the class B mode, and the Beacon frame carries GWEUI 6. The terminal can compare the GWEUI 6 carried in the received Beacon frame with the GWEUIs in the third base station identifier list, determine that GWEUI 6 is in the third base station identifier list, and does not send the third information.

Figure 6:
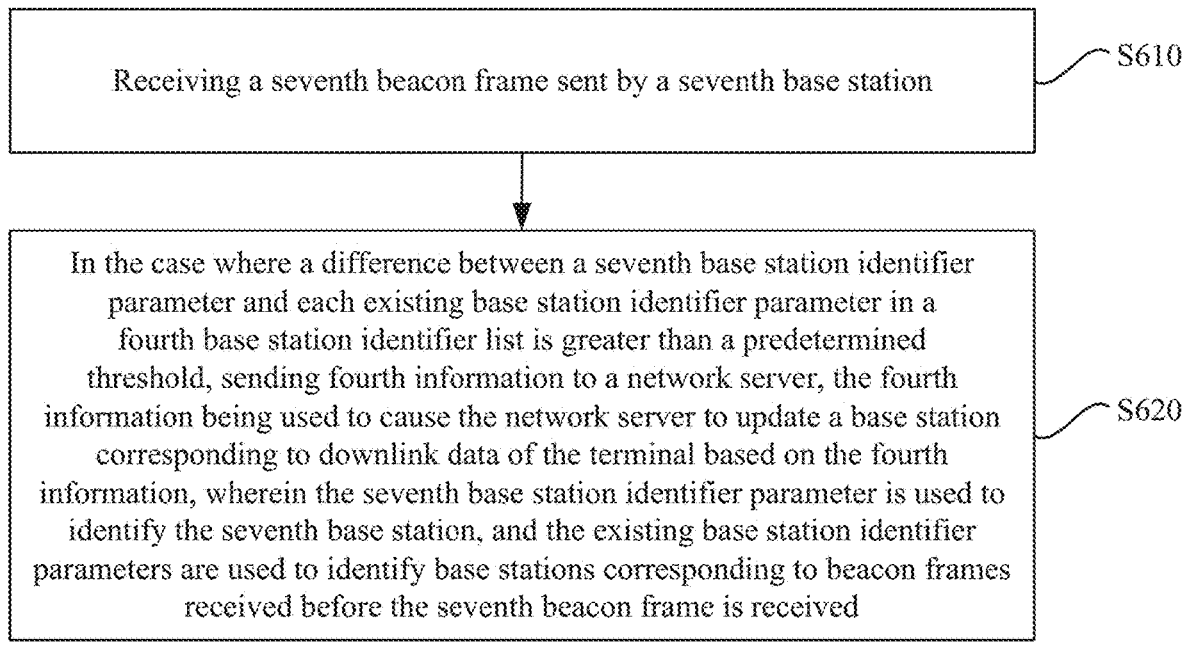
FIG. 6 is a schematic flowchart illustrating an exemplary communication method between a terminal and a base station, consistent with some embodiments of the present disclosure.

FIG. 6 is a schematic flowchart illustrating an exemplary communication method between a terminal and a base station, consistent with some embodiments of the present disclosure. The method shown in FIG. 6 can be performed by a terminal. The method can include the following steps.

In step S610, a seventh beacon frame sent by a seventh base station is received.

In step S620, in the case where a difference between a seventh base station identifier parameter and each existing base station identifier parameter in a fourth base station identifier list is greater than a predetermined threshold, fourth information is sent to a network server.

The seventh base station identifier parameter is used to identify the seventh base station. The fourth base station identifier list can include a plurality of existing base station identifier parameters, and each existing base station identifier parameter can be used to characterize a base station corresponding to a beacon frame received before the seventh beacon frame is received. For example, if before the seventh beacon frame is received, beacon frame 1 from base station 1, beacon frame 2 from base station 2, and beacon frame 3 from base station 3 are also received, then the fourth base station identifier list can include base station identifier parameter 1 used to characterize base station 1, base station identifier parameter 2 used to characterize base station 2, and base station identifier parameter 3 used to characterize base station 3.

In the present disclosure, a base station identifier parameter can be location information used to characterize the location of a base station or a combination of the location information used to characterize the location of the base station and received signal strength information used to characterize the received signal strength of the beacon frame sent by the base station.

In the case where the base station identifier parameter is the location information, the seventh beacon frame includes seventh location information used to characterize the seventh base station. The seventh location information can be compared with each existing base station identifier parameter (i.e., existing location information) in the fourth base station identifier list to determine whether there is existing location information in the fourth base station identifier list whose distance to the seventh location information is less than a first predetermined threshold. If there is such existing location information, it indicates that the seventh base station that sends the seventh beacon frame is not a new base station, and then the fourth information is not sent to the network server. If there is no such existing location information, it indicates that the seventh base station that sends the seventh beacon frame is a new base station, and then the fourth information is sent to the network server.

In the case where the base station identifier parameter is a combination of location information and received signal strength information, the seventh beacon frame includes seventh location information used to characterize the seventh base station, and the received signal strength information of the received seventh beacon frame can be recorded (for the sake of distinction, it can be referred to as "third received signal strength information"). The seventh location information and the third received signal strength information can be compared with each set of base station identifier parameters (i.e., location information and received signal strength information) recorded in the fourth base station identifier list. If there is no base station identifier parameter in the fourth base station identifier list for which the difference in location information is less than the first predetermined threshold and the difference in received signal strength is less than the second predetermined threshold, it can be considered that the seventh base station that sends the seventh beacon frame is a new base station, and the fourth information is sent to the network server.

The same as the role of the first information described above, the fourth information is used to cause the network server to update the base station corresponding to the downlink data of the terminal based on the first information. The fourth information can be an information frame that carries certain data information, such as a base station update request (that is, an uplink route update frame). In addition, the fourth information can also be an empty packet, and the data content contained in the fourth information is not limited in the present disclosure. The fourth information sent can be received by one or more base stations and forwarded by the one or more base stations to the network server. The network server can update a base station corresponding to downlink data of the terminal according to quality data of the fourth information received (such as received signal strength indicator (RSSI) or signal-to-noise ratio (SNR)). For example, the base station with the largest received signal strength indicator (RSSI) or signal-to-noise ratio (SNR) can be selected as the base station corresponding to the downlink data of the terminal.

Figure 7:
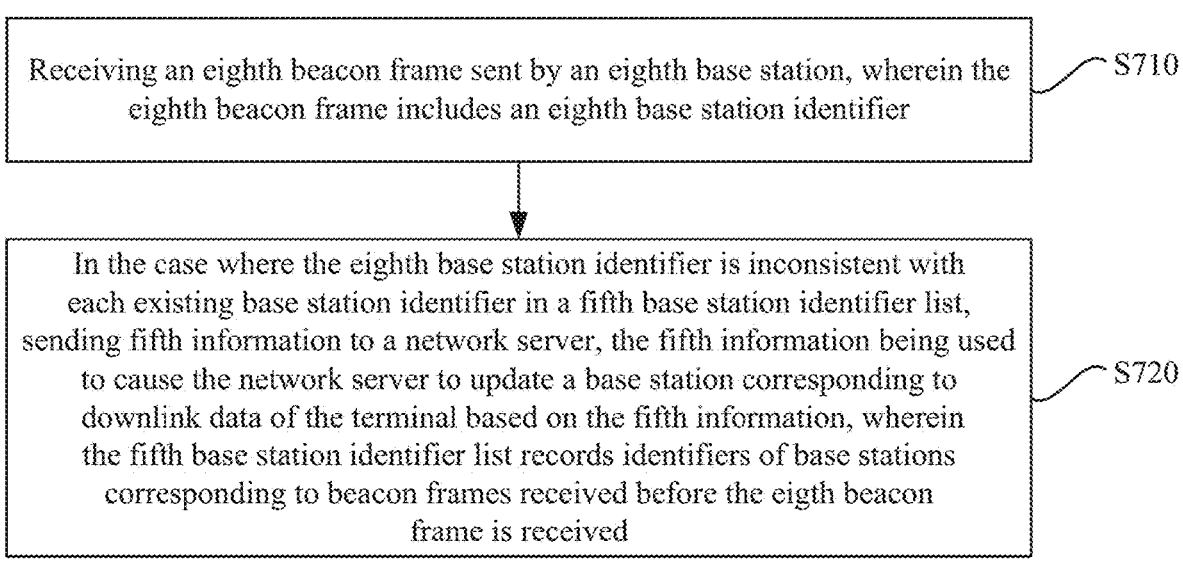
FIG. 7 is a schematic flowchart illustrating an exemplary communication method between a terminal and a base station, consistent with some embodiments of the present disclosure.

FIG. 7 is a schematic flowchart illustrating an exemplary communication method between a terminal and a base station, consistent with some embodiments of the present disclosure. The method shown in FIG. 7 can be performed by a terminal. The method can include the following steps.

In step S710, an eighth beacon frame sent by an eighth base station is received, and the eighth beacon frame includes an eighth base station identifier.

In step S720, in the case where the eighth base station identifier is inconsistent with each existing base station identifier in a fifth base station identifier list, fifth information is sent to a network server.

The eighth base station identifier is used to identify the eighth base station that sends the eighth beacon frame. The fifth base station identifier list can include a plurality of existing base station identifiers, and each existing base station identifier can be used to identify a base station corresponding to a beacon frame received before a seventh beacon frame is received. For example, if before the seventh beacon frame is received, beacon frame 1 from base station 1, beacon frame 2 from base station 2, and beacon frame 3 from base station 3 are also received, then the fifth base station identifier list can include existing base station identifier 1 used to identify base station 1, existing base station identifier 2 used to identify base station 2, and existing base station identifier 3 used to identify base station 3. The base station identifiers can be base station extended unique identifiers (Gateway Extended Unique Identifiers, GWEUIs), such as in a format of 64-bit EUIs.

After the eighth beacon frame is received, the eighth base station identifier in the eighth beacon frame can be compared with each existing base station identifier in the base station list. If the eighth base station identifier is inconsistent with each existing base station identifier in the fifth base station identifier list, that is, the eighth base station identifier does not appear in the fifth base station identifier list, it can be considered that the eighth base station that sends the eighth beacon frame is a new base station, and the fifth information is sent to the network server. If the eighth base station identifier appears in the fifth base station identifier list, it can be considered that the eighth base station that sends the eighth beacon frame is not a new base station, and the fifth information is not sent to the network server.

The same as the role of the first information described above, the fifth information is used to cause the network server to update the base station corresponding to the downlink data of the terminal based on the first information. The fifth information can be an information frame that carries certain data information, such as a base station update request (that is, an uplink route update frame). In addition, the fifth information can also be an empty packet, and the data content contained in the fifth information is not limited in the present disclosure. The fifth information sent can be received by one or more base stations, and forwarded by the one or more base stations to the network server. The network server can update a base station corresponding to downlink data of the terminal according to quality data of the fifth information received (such as received signal strength indicator (RSSI) or signal-to-noise ratio (SNR)). For example, the base station with the largest received signal strength indicator (RSSI) or signal-to-noise ratio (SNR) can be selected as the base station corresponding to the downlink data of the terminal.

Figure 8:
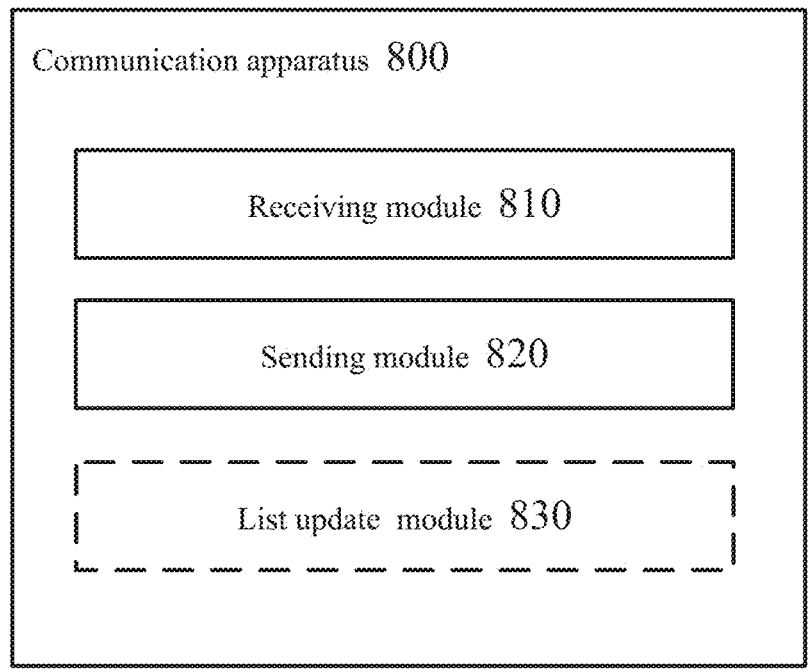
FIG. 8 is a schematic block diagram illustrating the structure of an exemplary communication apparatus between a terminal and a base station, consistent with some embodiments of the present disclosure.

FIG. 8 is a schematic block diagram illustrating the structure of an exemplary communication apparatus between a terminal and a base station, consistent with some embodiments of the present disclosure. The apparatus shown in FIG. 8 can be set at a terminal.

Referring to FIG. 8, communication apparatus 800 includes receiving module 810 and sending module 820. In addition, list update module 830 shown in the dashed box in the figure can optionally be included.

In some embodiments, receiving module 810 is used to receive a first beacon frame sent by a first base station. The first beacon frame includes first location information, and the first location information is used to characterize a location of the first base station. Sending module 820 is used to, in the case where a distance between the first location information and second location information is greater than a first predetermined threshold, or a difference between first received signal strength information and second received signal strength information is greater than a second predetermined threshold, send first information to a network server, the first information being used to cause the network server to update a base station corresponding to downlink data of the terminal based on the first information, wherein the second location information is used to characterize the location of a second base station corresponding to a second beacon frame received before the first beacon frame is received, and the second received signal strength information is used to characterize a received signal strength of the second beacon frame.

In some embodiments, before receiving the first beacon frame sent by the first base station, receiving module 810 can further be used to receive the second beacon frame sent by the second base station, and the second beacon frame includes the second location information. The communication apparatus can further include a recording module for recording the second received signal strength information of the second beacon frame.

In some embodiments, the second location information and the second received signal strength information can be recorded in a first base station identifier list. List update module 830 is used to write (for example, write in association) the first location information and the first received signal strength information into the first base station identifier list in the case where the distance between the first location information and the second location information is greater than the first predetermined threshold or where the difference between the first received signal strength information and the second received signal strength information is greater than the second predetermined threshold.

In some embodiments, receiving module 810 is used to receive a third beacon frame sent by a third base station. The third beacon frame includes third location information, and the third location information is used to characterize the location of the third base station. Sending module 820 is used to, in the case where a distance between the third location information and fourth location information is greater than the first predetermined threshold, send second information to a network server, the second information being used to cause the network server to update a base station corresponding to downlink data of the terminal based on the second information, wherein the fourth location information is used to characterize the location of a fourth base station corresponding to a fourth beacon frame received before the third beacon frame is received.

In some embodiments, before receiving the third beacon frame sent by the third base station, receiving module 810 is further used to receive the fourth beacon frame sent by the fourth base station, and the fourth beacon frame includes fourth location information.

In some embodiments, the fourth location information is recorded in a second base station identifier list, and list update module 830 is used to, in the case where the distance between the third location information and the fourth location information is greater than the first predetermined threshold, write the third location information into the second base station identifier list.

In some embodiments, receiving module 810 is used to receive a fifth beacon frame sent by a fifth base station, and the fifth beacon frame includes a first base station identifier. Sending module 820 is used to, in the case where the first base station identifier is inconsistent with a sixth base station identifier, send third information to a network server, the third information being used to cause the network server to update a base station corresponding to downlink data of the terminal based on the third information, wherein the sixth base station identifier is used to identify a sixth base station corresponding to a sixth beacon frame received before the fifth beacon frame is received.

In some embodiments, receiving module 810 is further used to, before receiving the fifth beacon frame sent by the fifth base station, receive the sixth beacon frame sent by the sixth base station, and the sixth beacon frame includes the sixth base station identifier.

In some embodiments, the sixth base station identifier is recorded in a third base station identifier list, and list update module 830 is used to write the first base station identifier into the third base station identifier list in the case where the first base station identifier is inconsistent with the sixth base station identifier.

In some embodiments, receiving module 810 is used to receive a seventh beacon frame sent by a seventh base station. Sending module 820 is used to, in the case where a difference between a seventh base station identifier parameter and each existing base station identifier parameter in a fourth base station identifier list is greater than a predetermined threshold, send fourth information to a network server, the fourth information being used to cause the network server to update a base station corresponding to downlink data of the terminal based on the fourth information, wherein the seventh base station identifier parameter is used to identify the seventh base station, and the existing base station identifier parameters are used to identify base stations corresponding to beacon frames received before the seventh beacon frame is received.

In some embodiments, receiving module 810 is used to receive an eighth beacon frame sent by an eighth base station, and the eighth beacon frame includes an eighth base station identifier. Sending module 820 is used to, in the case where the eighth base station identifier is inconsistent with each existing base station identifier in a fifth base station identifier list, send fifth information to a network server, the fifth information being used to cause the network server to update a base station corresponding to downlink data of the terminal based on the fifth information, wherein the fifth base station identifier list records identifiers of base stations corresponding to beacon frames received before the eighth beacon frame is received.

Figure 9:
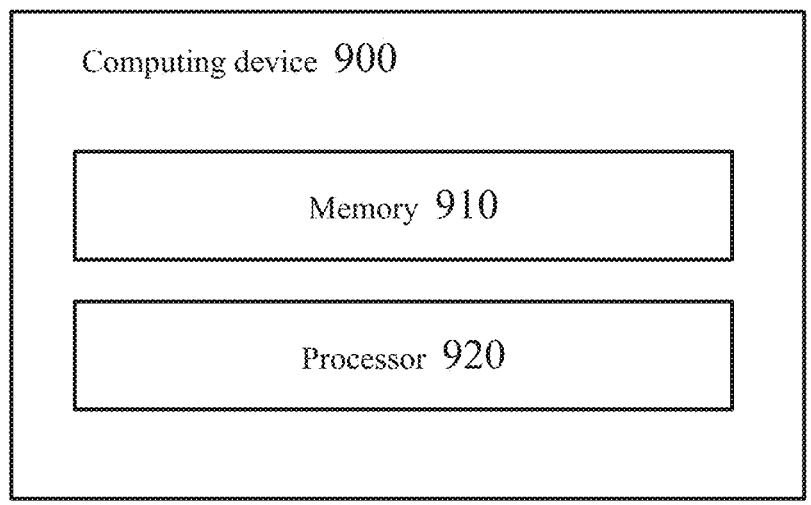
FIG. 9 illustrates a schematic structural diagram of an exemplary computing device, consistent with some embodiments of the present disclosure.

FIG. 9 illustrates a schematic structural diagram of an exemplary computing device, consistent with some embodiments of the present disclosure.

Referring to FIG. 9, computing device 900 includes memory 910 and processor 920.

Processor 920 can be a multi-core processor, or can include a plurality of processors. In some embodiments, processor 920 can include a general-purpose main processor and one or more special co-processors, for example, a graphics processing unit (GPU), a digital signal processor (DSP), and so on. In some embodiments, processor 920 can be implemented using a customized circuit, for example, an Application Specific Integrated Circuit (ASIC) or a Field Programmable Gate Array (FPGA).

Memory 910 can include various types of storage units, for example, a system memory, a read only memory (ROM), and a permanent storage device. The ROM can store static data or instructions required by processor 920 or other modules of the computer. The permanent storage device can be a read-write storage device. The permanent storage device can be a non-volatile storage device that does not lose stored instructions and data even after the computer is powered off. In some embodiments, the permanent storage device adopts a large-capacity storage device (for example, a magnetic or optical disk and a flash memory) as the permanent storage device. In some embodiments, the permanent storage device can be a removable storage device (for example, a floppy disk and an optical drive). The system memory can be a read-write storage device or a volatile read-write storage device, for example, a dynamic random access memory. The system memory can store some or all of the instructions and data required by the processor at runtime. In addition, memory 910 can include any combination of computer-readable storage media, including various types of semiconductor memory chips (DRAMs, SRAMs, SDRAMs, flash memories, and programmable read-only memories), and magnetic disks or optical disks can also be used. In some embodiments, memory 910 can include a removable storage device that can be read or written, for example, a compact disk (CD), a read-only digital versatile disk (for example, a DVD-ROM, a dual-layer DVD-ROM, etc.), a read-only Blu-ray disk, a ultra-density disk, a flash memory card (for example, an SD card, a min SD card, a Micro-SD card, etc.), a magnetic floppy disk, etc. The computer-readable storage media do not include carrier waves and transient electronic signals transmitted in a wireless or wired manner.

Memory 910 stores executable code, which, when processed by processor 920, can cause processor 920 to execute the communication method between a terminal and a base station described above.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

What is claimed is:

1. A communication method performed by a mobile terminal, the method comprising:
   receiving a first beacon frame sent by a first base station, wherein the first beacon frame comprises first location information representing a location of the first base station; and
   in response to one of a determination that a distance between the first location information and second location information is greater than a first predetermined threshold or a determination that a difference between first received signal strength information and second received signal strength information is greater than a second predetermined threshold, sending first information to a network server, the first information causing the network server to select a base station that transmits downlink data to the mobile terminal,
   wherein the second location information represents a location of a second base station corresponding to a second beacon frame received before the first beacon frame is received, the first received signal strength information comprises a received signal strength of the first beacon frame, and the second received signal strength information comprises a received signal strength of the second beacon frame.

2. The communication method according to claim 1, wherein before receiving the first beacon frame sent by the first base station, the method further comprises:
   receiving the second beacon frame sent by the second base station, wherein the second beacon frame comprises the second location information.

3. The communication method according to claim 1, wherein before receiving the first beacon frame sent by the first base station, the method further comprises:
   receiving the second beacon frame sent by the second base station, and
   recording the second received signal strength information of the second beacon frame.

4. The communication method according to claim 1, wherein the second location information and the second received signal strength information are recorded in a first base station identifier list, and the method further comprises:
   in response to one of a determination that the distance between the first location information and the second location information is greater than the first predetermined threshold or a determination that the difference between the first received signal strength information and the second received signal strength information is greater than the second predetermined threshold, writing the first location information and the first received signal strength information into the first base station identifier list.

5. The communication method according to claim 1, further comprising:
   in response to one of a determination that the distance between the first location information and the second location information is not greater than the first predetermined threshold or a determination that the difference between the first received signal strength information and the second received signal strength information is not greater than the second predetermined threshold, skipping sending the first information to the network server.

6. A mobile terminal comprising:
   a memory storing a set of instructions; and
   one or more processors configured to execute the set of instructions to cause the mobile terminal to perform:
      receiving a first beacon frame sent by a first base station, wherein the first beacon frame comprises first location information representing a location of the first base station; and
      in response to one of a determination that a distance between the first location information and second location information is greater than a first predetermined threshold or a determination that a difference between first received signal strength information and second received signal strength information is greater than a second predetermined threshold, sending first information to a network server, the first information causing the network server to select a base station that transmits downlink data to the mobile terminal,
      wherein the second location information represents a location of a second base station corresponding to a second beacon frame received before the first beacon frame is received, the first received signal strength information comprises a received signal strength of the first beacon frame, and the second received signal strength information comprises a received signal strength of the second beacon frame.

7. The mobile terminal of claim 6, wherein before receiving the first beacon frame sent by the first base station, the one or more processors are configured to execute the set of instructions to cause the mobile terminal to further perform:

receiving the second beacon frame sent by the second base station, wherein the second beacon frame comprises the second location information.

8. The mobile terminal of claim 6, wherein before receiving the first beacon frame sent by the first base station, the one or more processors are configured to execute the set of instructions to cause the mobile terminal to further perform:
receiving the second beacon frame sent by the second base station, wherein the second beacon frame comprises the second location information.

9. The mobile terminal of claim 6, wherein the second location information and the second received signal strength information are recorded in a first base station identifier list, and the one or more processors are configured to execute the set of instructions to cause the mobile terminal to further perform:
in response to one of a determination that the distance between the first location information and the second location information is greater than the first predetermined threshold or a determination that the difference between the first received signal strength information and the second received signal strength information is greater than the second predetermined threshold, writing the first location information and the first received signal strength information into the first base station identifier list.

10. The mobile terminal of claim 6, wherein the one or more processors are configured to execute the set of instructions to cause the mobile terminal to further perform:
in response to one of a determination that the distance between the first location information and the second location information is not greater than the first predetermined threshold or a determination that the difference between the first received signal strength information and the second received signal strength information is not greater than the second predetermined threshold, skipping sending the first information to the network server.

11. A non-transitory computer readable medium that stores a set of instructions that is executable by at least one processor of a mobile terminal to cause the mobile terminal to perform a communication method, the method comprising:
receiving a first beacon frame sent by a first base station, wherein the first beacon frame comprises first location information representing a location of the first base station; and
in response to one of a determination that a distance between the first location information and second location information is greater than a first predetermined threshold or a determination that a difference between first received signal strength information and second received signal strength information is greater than a second predetermined threshold, sending first information to a network server, the first information causing the network server to select a base station that transmits downlink data to the mobile terminal,
wherein the second location information representing a location of a second base station corresponding to a second beacon frame received before the first beacon frame is received, the first received signal strength information comprises a received signal strength of the first beacon frame, and the second received signal strength information comprises a received signal strength of the second beacon frame.

12. The non-transitory computer readable medium of claim 11, wherein before receiving the first beacon frame sent by the first base station, the at least one processor configured to execute the set of instructions to cause the mobile terminal to further perform:
receiving the second beacon frame sent by the second base station, wherein the second beacon frame comprises the second location information.

13. The non-transitory computer readable medium of claim 11, wherein before receiving the first beacon frame sent by the first base station, the at least one processor configured to execute the set of instructions to cause the mobile terminal to further perform:
receiving the second beacon frame sent by the second base station, and recording the second received signal strength information of the second beacon frame.

14. The non-transitory computer readable medium of claim 11, wherein the second location information and the second received signal strength information are recorded in a first base station identifier list, the at least one processor configured to execute the set of instructions to cause the mobile terminal to further perform:
in response to one of a determination that the distance between the first location information and the second location information is greater than the first predetermined threshold or a determination that the difference between the first received signal strength information and the second received signal strength information is greater than the second predetermined threshold, writing the first location information and the first received signal strength information into the first base station identifier list.

15. The non-transitory computer readable medium of claim 11, wherein the at least one processor is configured to execute the set of instructions to cause the mobile terminal to further perform:
in response to one of a determination that the distance between the first location information and the second location information is not greater than the first predetermined threshold or a determination that the difference between the first received signal strength information and the second received signal strength information is not greater than the second predetermined threshold, skipping sending the first information to the network server.

* * * * *